United States Patent

[11] 3,588,556

| [72] | Inventors | Adolfo M. Guzman;<br>Paul Y. Hu, Boulder, Colo. |
|---|---|---|
| [21] | Appl. No. | 887,568 |
| [22] | Filed | Dec. 23, 1969 |
| [45] | Patented | June 28, 1971 |
| [73] | Assignee | International Business Machines Corporation<br>Armonk, N.Y. |

[54] LOW IMPEDANCE TRANSVERSE COOLING OF ELECTRIC MOTORS
10 Claims, 3 Drawing Figs.

[52] U.S. Cl. ............................................. 310/58,
310/85, 310/266
[51] Int. Cl. ................................................ H02k 9/00
[50] Field of Search .......................................... 310/52, 54,
58, 55, 59, 64, 266, 152, 261, 262, 268, 85

[56] References Cited
UNITED STATES PATENTS

| 3,102,964 | 9/1963 | Bennett | 310/266 |
| 3,209,187 | 9/1965 | Angele | 310/266 |
| 3,469,121 | 9/1969 | Smith | 310/52 |
| 3,490,672 | 1/1970 | Fisher | 310/266 |
| 1,121,014 | 12/1914 | Hobart | 310/52 |
| 2,604,500 | 7/1952 | De Koning | 310/52 |

*Primary Examiner*—D. X. Sliney
*Assistant Examiner*—R. J. Skudy
*Attorneys*—Hanifin and Jancin and Francis A. Sirr

ABSTRACT: An electric motor with a low inertia armature having a transverse cooling airflow from a high pressure chamber to a low pressure chamber in a direction parallel to and in contact with the circumference of the armature.

INVENTORS
ADOLFO M. GUZMAN
PAUL Y. HU

BY

ATTORNEY

LOW IMPEDANCE TRANSVERSE COOLING OF ELECTRIC MOTORS

BACKGROUND OF THE INVENTION

1. Field of Invention

This invention relates to electric motors and to the cooling of electric motors by forced airflow and more particularly to the cooling of low inertia printed circuit armature electric motors.

2. Description of the Prior Art

Low inertia printed circuit motors with tubular armatures are known and being used where a requirement of very fast angular acceleration and deceleration is present. Because of the very low inertia of a hollow cylindrical armature, which consists of a carrier tube of epoxy or fiberglass-type material, and conductors attached to the inside and outside of such a tube by a bonding agent, these motors are extremely well suited for applications which require repeated starts and stops in a very rapid succession. These motors are very well adapted to very high or fast duty cycles, or start/stop operations.

One problem which has restricted the use of this type of motor to a duty cycle lower than its maximum capability is the cooling of the armature. With proper cooling, a motor of the type described driving a tape drive capstan can perform up to 250 start/stop operations per second, that is, a duty cycle of 250 cycles per second. The armature accelerates for 1.3 milliseconds, runs at running speed for 1.7 milliseconds, and decelerates to a stop in 1.0 millisecond. These accelerations create forces of up to 400 g's on portions of the armature. This extremely fast duty cycle and the extremely high forces result in abnormally high heat generated by the electrical resistance in the conductors in the armature, creating a temperature rise in the armature which is more severe than most electric motors.

Any substantial rise in the temperature of the armature has a deleterious effect on the bonding agent and the fiberglass tube which is the structural support for the armature conductors. As the temperature rises, the bonding agent and the tube weakens. Under stresses generated by 400 g's acceleration, any weakening of the bond or bonding agent can have the effect of complete failure of the armature.

Without cooling, a motor of the type discussed will normally fail after less than 2 minutes operation at maximum duty cycle conditions. Thus, it is apparent that effective cooling is required for operation of such a motor.

A second problem with temperature rise is experienced when the temperature causes the resistivity of the conductors to change. This temperature change then affects the characteristics of operation of the motor. In some environments in which a motor of this type is used, very exacting speeds and accelerations and decelerations are required. As an example, in the driving of a magnetic tape in the tape drive unit of a data processing system, the tape must pass the read/write head at a very precise velocity in order to accurately read or write data onto the magnetic recording media. Acceleration and deceleration must be closely controlled to assure that the tape has attained running speed by the start of the read/write portion of the duty cycle. Likewise, the tape must be stopped fast enough to allow the next acceleration before the data blocks pass the read/write head.

Prior art methods of cooling low inertia tubular armature motors have been primarily directed to longitudinal cooling, that being the longitudinal flow of air under pressure, forced through air guides in directions parallel to the axis of the armature. These airflow paths have been both external and internal to the armature tube. In motors of the type discussed, the gap distance between the pole piece and the flux return core is in the order of 0.035 inch. The armature thickness is in the order of 0.014 inch, leaving approximately 0.020 inch for cooling airflow. Thus, when a soft iron flux return core is placed internal to the tubular armature and the armature and core inserted within the pole pieces of the field magnets, it becomes apparent that there is approximately 0.010 inch on either side of the armature, through which to pass cooling air. When a longitudinal flow is utilized over the entire distance of the armature (which in practice is approximately 6 inches, depending upon the size and design of the motor), the soft iron flux return core and armature act as a plug in what would otherwise be a relatively free conduit. In order to get any substantial air passage around the armature and in order to cool the armature, it has been necessary to use blowers which force approximately 20 cubic feet per minute of air at a pressure of about 10—30 inches of water. This high volume and high-pressure require an expensive air pump and tight air couplings and fittings in order to provide sufficient pressure at the input region of the armature. Also, air guides were required between the pole pieces to restrict airflow to the region immediately adjacent to the armature tube so that the cooling air would not escape into the larger chambers between the pole pieces. Also, it was thought that it was necessary to force air through the interior of the armature tube and this was accomplished by cutting away channels in the soft iron return core. The removal of material in the core had the effect of reducing the efficiency of the motor.

The pressure at the inlet was substantially higher than the pressure at succeeding points along the length of the armature, and the airflow was not sufficient to adequately cool the armature. The reason that the heat was not adequately dissipated was that as cooling air progressed longitudinally along the armature, the air that did pass in proximity to the surface of the armature absorbed heat, thereby rising in temperature and was not as efficient in cooling subsequent incremental portions of the armature. The airflow through such a small area was found sufficient to efficiently and adequately reduce the temperature of the armature to a uniform point.

The effect of the longitudinal cooling was to create a temperature profile with the lowest temperature being at the inlet region and a substantially higher temperature at the outlet region. This created a shift in electrical characteristics within the motor and within individual conductors on the armatures. Also, the thermal gradient caused weakening of the bond between the armature conductors and the armature tube.

The alternative course of action attempted to eliminate the deleterious effects inherent in a longitudinal cooling system was increasing the airgap distance such that there was more free flow region between the surfaces of the armature and the flux return core and pole pieces. This provided superior cooling but, by increasing the distance between the armature surfaces and the flux return core and pole pieces, the efficiency of the motor was drastically reduced and the necessary operating conditions could not be attained.

With the prior art cooling methods, a motor of this type had an expected life of 20 to 30 million cycles. The prior art motors were acceptable as they met their design objectives but lack of adequate cooling placed limitations on the expected life of the motor.

OBJECTS OF THE INVENTION

It is an object of this invention to provide an improved method of cooling a low inertia tubular armature electric motor.

It is another object of this invention to provide a method of cooling to a low inertia tubular armature electric motor which maintains a uniform temperature profile on the armature.

It is still another object of this invention to provide a method of cooling a low inertia tubular armature electric motor which provides a high flow rate of cooling air with a small static pressure.

It is a further object of this invention to provide a low inertia tubular armature electric motor having a cooling flow transverse to the armature axis.

It is still another object of this invention to provide an improved transversely cooled electric motor.

It is another object of this invention to provide an extended life for an electric motor by cooling with a transverse cooling flow.

The foregoing and other objects, features, and advantages of the invention will be apparent from the following more particular description of preferred embodiments of the invention, as illustrated in the accompanying drawings.

SUMMARY OF THE INVENTION

The above objects and others are accomplished by constructing a low inertia printed circuit tubular armature motor in such a way that it has a plurality of chambers between the pole pieces. These chambers are sealed on one end. A cooling fluid is then forced under pressure into one chamber and allowed to flow between the armature and pole piece in a direction concentric to and parallel to the circumference of the tubular armature and then to escape to a low-pressure region in a chamber adjacent to the high-pressure region and separated therefrom by a pole piece of the field magnet assembly. By passing the cooling fluid in a direction which is transverse to the length dimension of the surface of the tubular armature and between the armature and the adjacent end of the pole piece, a relatively short flow through a restricted area is created which allows the use of a low-pressure, high volume coolant source and provides an even cooling throughout the entire length of the armature as each portion of the armature is exposed to cooling fluid for equal amounts of time and distance. The cooling fluid is substantially isothermal throughout the pressure chambers and increases only slightly in temperature during the short cooling transverse flow.

DRAWINGS

DETAILED DESCRIPTION

Figure 1:
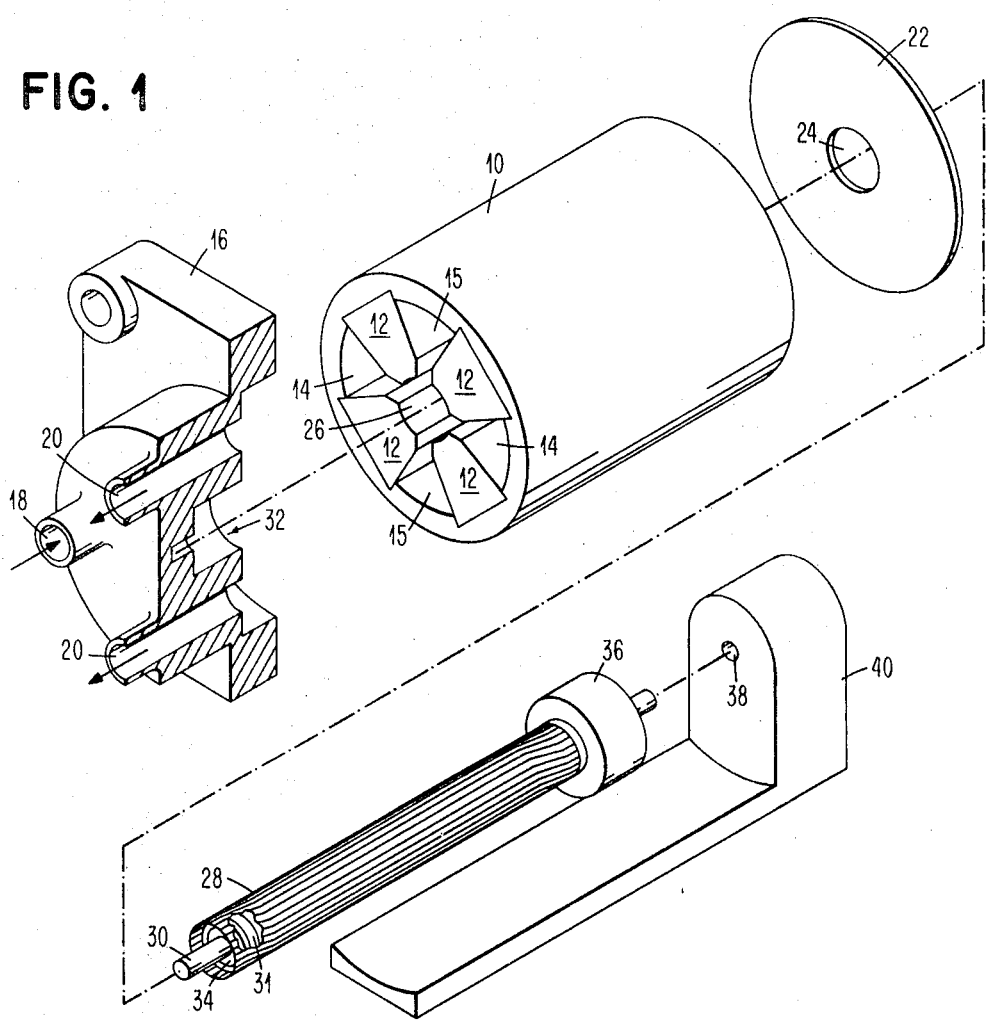
FIG. 1 is an exploded perspective of the low inertia printed circuit transverse cooling flow armature motor with a tape drive capstan and cooling fluid inlet and outlet connections illustrated.

To provide a support for pole pieces 12, a housing 10 is provided. Within the housing 10 is located a plurality of pole pieces 12. The pole pieces are highly magnetized permanent magnets and are attached to the housing 10 for support. The pole pieces 12 are spaced equidistant about the interior surface of the housing 10 and thereby provide chambers 14, 15 between each of the adjacent pole pieces 12. The pole pieces 12 are arranged so that their long axis is parallel to the axis of housing 10. The end 26 of the pole piece 12 which protrudes toward the axis of housing 10 is shaped to form an arc of a circle having a radius slightly greater than the external radius of the armature to be inserted within the cavity formed by the innermost ends 26 of pole pieces 12.

In order to provide a completed chamber, one end of housing 10 and pole pieces 12 is brought into an abutting relation with the inlet/outlet housing 16 which acts as a sealing plate. The inlet/outlet housing 16 has one inlet 18 or one outlet 20 for each chamber 14, 15 respectively within housing 10. Inlets 18 and outlets 20 are alternated so that two outlets 20 are adjacent to each inlet 18 and, conversely, two inlets 18 are opposite each other. This allows cooling fluid flow from one high-pressure chamber 14 to the two adjacent low-pressure chambers 15 in opposite transverse flow directions. The inlet/outlet housing also serves to seal one end of the chambers 14, 15. More broadly, in a multiple pole motor, each pole piece has a high-pressure chamber 14 on one side of the pole piece and a low-pressure chamber 15 on the other side of the pole piece.

The opposite end of housing 10 and pole pieces 12 are abutted against a sealing plate 22 of a configuration allowing the armature 28 to extend through a central opening 24, sealing plate 22 has an opening 24 in its centermost portion.

Sealing plate 22 provides completed chambers 14, 15 between each of the pole pieces 12. The only entrances or exits to these chambers 14, 15 are the inlets 18 or outlets 20 and the arcuate passage between the surface 26 of each pole piece, and the armature 28. Due to the relatively low-pressure used in this invention, a complete seal between housing 10 and plate 22 and between pole pieces 12 and plate 22 is not required. Only an abutting relationship is required. Small leakages are acceptable and, since a large volume capacity pump or fan is used, small leakages are compensated for by additional low-pressure fluid furnished by the pump.

In the preferred embodiment, inlet/outlet housing 16 also performs the function of supporting one end of armature 28 by receiving and supporting one end of the soft iron flux return core 31 on shaft 30. Armature 28 and soft iron flux return core 31 are inserted through the aperture 24 in sealing plate 22 and between the arcuate surfaces 26 of pole pieces 12 and into recesses 32. Fastening means, not shown, fastens portion 30 in recesses 32, preventing relative rotation. To support armature 28, a bearing 34 is provided, which is mounted coaxially on soft iron return core shaft 30. The bearing 34 does not need to be a sealed bearing as there is no forced airflow in the interior of the armature 28. To provide an output from the armature, the opposite end of the armature 28 is attached to tape capstan 36 in the illustrated embodiment. The armature 28 may be attached to any suitable load to provide an output for the forces developed by the armature 28 during operation.

The capstan 36 and armature 28 are supported on the second end of the shaft 30 by recess 38 in support frame 40 where the second end of shaft 30 is fastened to frame 40. A cooling fluid is defined as any dielectric noncombustible fluid which includes such gases as nitrogen, argon, other inert gases and air.

OPERATION OF THE INVENTION

In practice, two sources of cooling fluid are readily adaptable for use with this motor. One is a compressed fluid source; the other, ambient pressure combined with a vacuum pump of suitable volume capacity.

Figure 2:
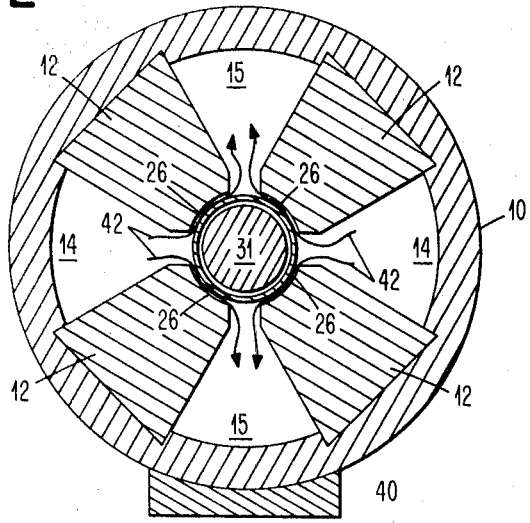
FIG. 2 is a sectional view of the motor, illustrating the directions of fluid flow.
Figure 3:
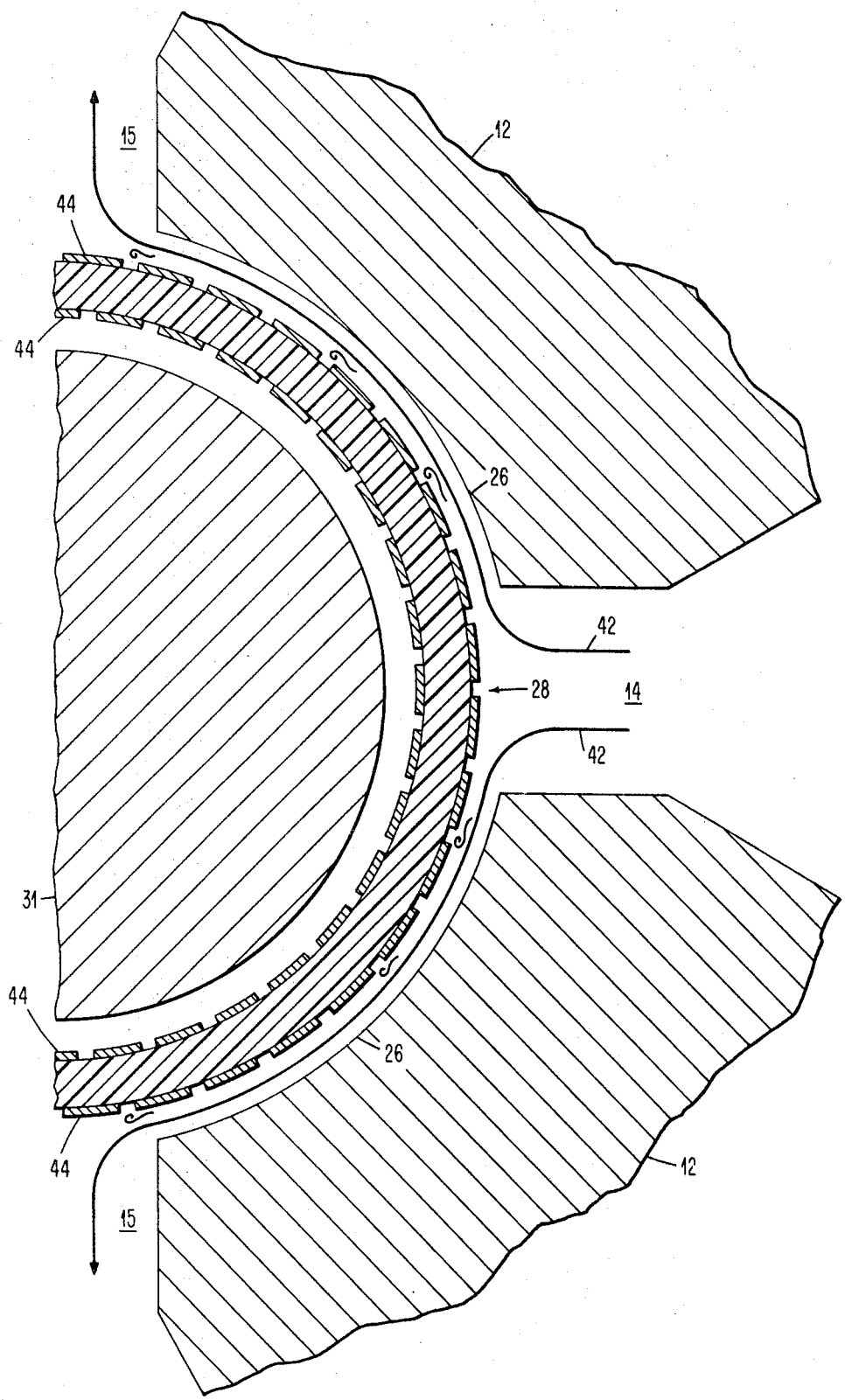
FIG. 3 is an enlarged view of the region between the flux return core and the pole pieces.

Using a compressed cooling fluid source or a fan to provide pressurized cooling fluid to the motor, the pressurized cooling fluid is introduced into inlets 18 and passed into pressure chambers 14. An outlet passage is provided from exhaust chamber 15 to the outside or ambient air through a suitable connection and outlet 20. The cooling fluid is passed into inlet 18 and into chamber 14 where the pressure in chamber 14 is maintained at approximately 1—2 inches of water. This is a reduction in pressure by a factor of at least 10 from the prior art practices of longitudinal cooling flow. The volume of cooling fluid which is introduced to all chambers of a motor is maintained at the rate of approximately 20 cubic feet per minute. The pressures at the outlets 20 are atmospheric, and the cooling fluid may be exhausted at outlets 20 or may be conducted through a conduit through some exhaust port. Since chambers 14 are relatively large, there is relatively little pressure drop along the length of the chamber. The natural tendency of a pressurized fluid to flow from a region of high-pressure to a region of low-pressure forces the cooling fluid into the clearance gap between arcuate surfaces 26 of pole pieces 12. The exterior cylindrical surface of armature 28 is best observed in FIGS. 2 and 3. In FIGS. 2 and 3, fluid flow arrows 42 illustrate the flow paths of the cooling fluid from the region of high-pressure 14 to the region of low-pressure 15. This flow pattern occurs throughout the entire length of the motor. As the fluid passes between the arcuate surfaces 26 of pole pieces 12 and the exterior surface of armature 28, the cooling fluid is throttled by the constriction and the pressure drop experienced across the entire path of travel between the pole piece 12 and the armature 28 is such that the pressure of the cooling fluid exiting into the low-pressure region 15 is at or near atmospheric pressure.

The conductors 44 on the armature 28 are essentially rectangular in shape and present sharp corners extending into the cooling fluid flow, illustrated by arrows 42. The gaps between conductors 44 are not filled with any material and, thus, present discontinuities in the surface. This condition is best observed in FIG. 3. As the cooling fluid moves between the pole piece 12 and the armature 28, the laminar flow of the cooling flow which would normally exist in this condition is broken up by turbulent eddies which are formed by the discontinuity of the exterior surface of the armature 28. This increases the effectiveness of heat transfer from armature 28 and its conductors 44 to the cooling fluid passing in proximity to the armature 28.

As this motor is bidirectional, no advantage or disadvantage is encountered by having bidirectional airflow where approximately half the cooling fluid is flowing in the direction of rotation and the remaining cooling fluid is flowing in a direction contra to the direction of rotation of the armature 28. The armature 28 is reversed in direction of rotation sufficiently often so that equal cooling conditions will exist throughout the motor. Since the motor is reversed in direction frequently, any slight inequality of cooling in the two opposite flow paths from each high-pressure chamber is cancelled out, and the cooling at all points of the armature is substantially uniform independent of time.

The temperature of different points along the length of the armature is maintained substantially uniform since the longest cooling fluid flow path is approximately one-half to three-fourths of one inch in contact with the armature 28.

When cooling is accomplished by the flow passing between the exterior surface of the armature and the arcuate surface 26 of pole piece 12 in a direction across the conductors 44, the flow is defined as being transverse flow and will hereafter be referred to as such.

Since the pressure in the high-pressure chamber 14 is substantially uniform throughout the entire length of the motor housing 10, equal flow occurs at all points along the length of the armature, creating uniform cooling.

An alternative to providing the air under pressure by compression is accomplished by using a vacuum pump to evacuate the low-pressure chambers 15 and provide the described flow rate and pressure differential.

The vacuum pump would be connected to the outlets 20. The same phenomena is encountered as when the high-pressure chamber is provided with pressurized air. The cooling fluid flow is from the region of high pressure to the region of low pressure (i.e., chamber 14 to 15). The same turbulent airflow occurs in the region between armature 28 and arcuate surface 26. One possible advantage to the use of the vacuum source as a way of reducing the pressure in low-pressure chambers 15 to produce this airflow is that air entering from the atmosphere through entrance ports 18 in inlet/outlet housing 16 will be at ambient atmospheric temperature while air which would be introduced into chambers 14 under pressure would of necessity be heated slightly during the compression phase. This slight increase in the temperature of the inlet air due to compression is not appreciable and has very little, if any, effect on the operation or cooling of the motor.

Either the use of a vacuum to reduce the pressure in chambers 15 or the use of a fan or pressure pump to increase the pressure in chambers 14 is equally acceptable in practice and would be dictated by the availability of the two alternative apparatuses.

By using the transverse cooling flow, as disclosed above, the length of the motor does not affect its cooling characteristics, thereby providing the flexibility needed to produce more powerful low inertia printed circuit tubular armature motors.

As one skilled in the art can see in the foregoing description of the motor and the operation thereof, the temperature along the length of the armature is constant and the temperature conditions within the motor do not create variances in electrical characteristics or weaken the bonds holding the conductors on the armature tube.

Heretofore, the industry standard for this general type of electric motor has been considered to be 20 to 30 million cycles prior to failure. The best service encountered, using prior art motors, has been approximately 100 million cycles prior to failure. By incorporating the above-disclosed transverse cooling flow, test results indicate that reliable motor life may now be extended to in excess of two billion cycles due to the uniform cooling of the armature.

Although the invention is disclosed as an electric motor and a method of cooling a motor, it is recognized that this invention is applicable to cooling any rotatable body in a similar manner. Further, the inlet/outlet housing has been disclosed as combined with a sealing plate, but it is recognized that the inlet and outlet connections may be made through the housing or in another manner.

The invention is disclosed as utilizing pole pieces as the elements contributing to the completeness of the pressure and exhaust chambers, but any barrier means may be used to complete the chambers as described.

While the invention has been particularly shown and described with reference to preferred embodiments thereof, it will be understood by those skilled in the art that the foregoing and other changes in form and details may be made therein without departing from the spirit and the scope of the invention.

We claim:

1. A method for cooling a rotatable cylindrical electric motor armature comprising the steps of:
    impinging fluid from a plurality of higher-pressure regions radially inward into contact with said armature at a plurality of regions spaced around the periphery of said armature;
    restricting said fluid to a transverse flow partially around said armature; and
    exhausting said fluid radially outward from said armature into a plurality of lower-pressure regions which are alternately spaced with said higher-pressure regions.

2. The method of cooling as in claim 1 wherein said restricting said fluid to a transverse flow partially around said armature creates a zone of turbulence adjacent said armature.

3. A method of cooling an electric motor comprising the steps of:
    introducing a cooling fluid from a higher-pressure region into a plurality of circumferentially spaced pressure chambers extending longitudinally through the length of said motor;
    expelling said fluid from said pressure chambers into contact with the armature of said motor;
    passing said fluid in contact with said armature between said armature and adjacent pole pieces of said motor to restrict the flow of said fluid to a transverse direction; and
    exhausting said fluid into a plurality of lower-pressure regions which are alternately spaced with said higher-pressure regions and extend longitudinally through the length of said motor.

4. A method of cooling as in claim 1 wherein said higher-pressure region is ambient pressure and wherein said lower-pressure region is subambient.

5. A method of cooling as in claim 4 wherein said flow partially around said armature creates a zone of turbulence adjacent said armature.

6. A method of cooling as defined in claim 3 wherein said higher-pressure region is ambient pressure, and wherein said lower-pressure region is a partially evacuated exhaust chamber.

7. An electric motor having transverse cooling flow motor, comprising:
    a housing means;
    a plurality of barrier means circumferentially spaced apart in the interior of said housing;
    a plurality of chambers intermediate said barrier means and opening toward a central axis of said housing;
    said chambers being alternately high- and low-pressure chambers;

first and second flow means communicating with said high-pressure chambers and said low-pressure chambers, respectively;

a first sealing means sealing a first end of said housing;

a second sealing means sealing the second end of said housing; and rotatable armature means coaxially supported within said housing.

8. An electric motor as in claim 7 wherein said barrier means are magnetic pole pieces.

9. An electric motor as in claim 8 wherein said first and second flow means are inlet means and outlet means, respectively.

10. A uniformly cooled transverse flow electric motor, comprising:

a housing;

a plurality of magnetic pole pieces circumferentially spaced apart within the interior of said housing;

a plurality of chambers intermediate said pole pieces, said chambers opening toward the central axis of said housing and being alternately high- and low-pressure chambers;

a first sealing plate abutting a first end of said housing and said pole pieces;

inlet and outlet connections extending through said first sealing plate and communicating with said high- and low-pressure chambers respectively;

a second sealing plate abutting a second end of said housing and said pole pieces;

a magnetic flux return core coaxially supported within said housing;

a hollow printed circuit tubular armature coaxially rotatable in said housing and surrounding said flux return core; and output means attached to said armature.